CONCENTRATION OF AQUEOUS ACIDS BY FLASH DISTILLATION
Filed Aug. 25, 1949
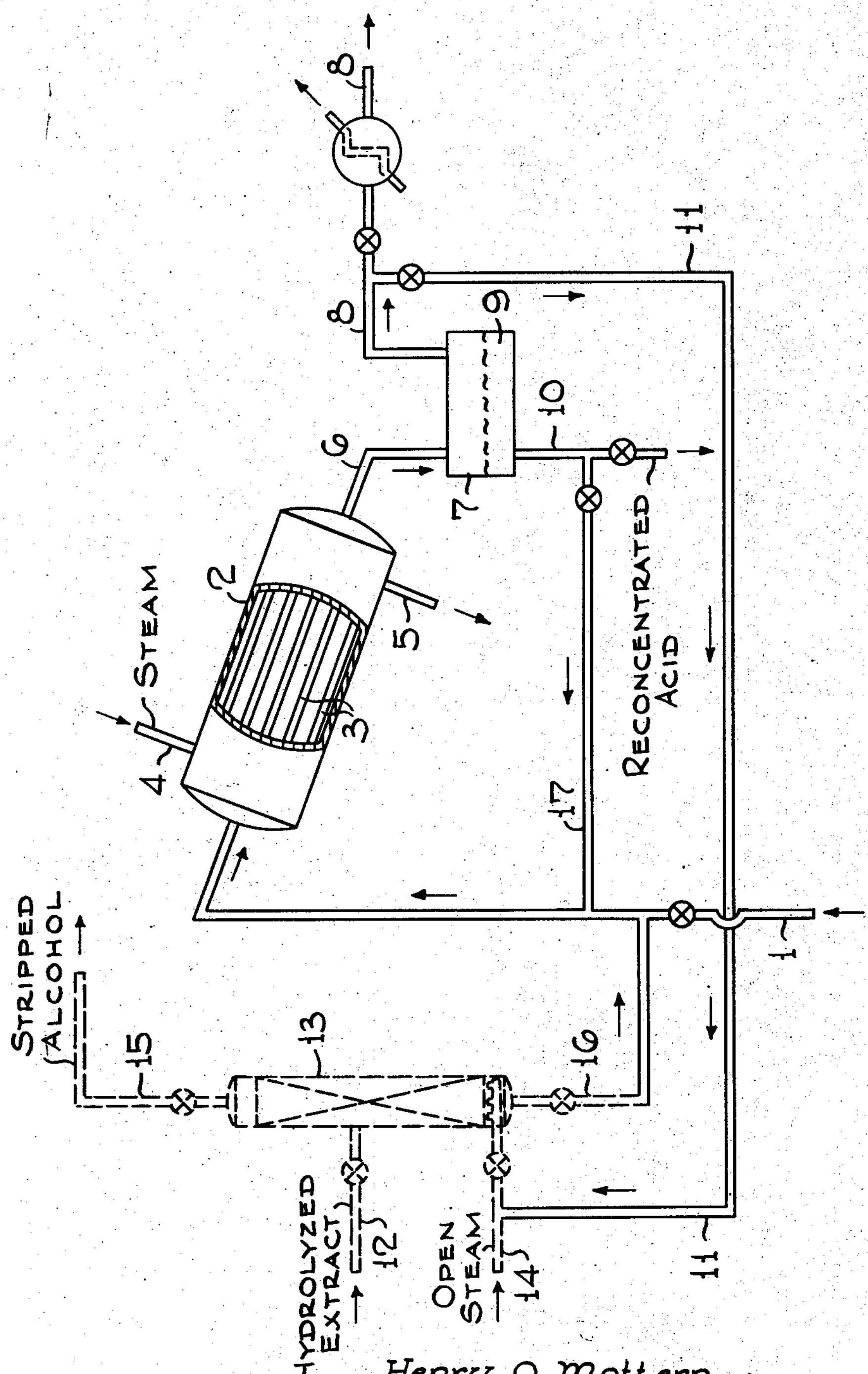
Henry O. Mottern
William C. Harney
Inventors
By C. A. Slote Attorney United States Patent Office 2,711,388

Patented June 21, 1955

1

2,711,388

CONCENTRATION OF AQUEOUS ACIDS BY FLASH DISTILLATION

Henry O. Mottern, Bloomfield, and William C. Harney, Summit, N. J., assignors to Esso Research and Engineering Company, a corporation of Delaware Application August 25, 1949, Serial No. 112,344

4 Claims. (Cl. 202—53)

This invention relates to the concentration of aqueous acids. Specifically the invention is concerned with the concentration of aqueous acids by means of a particular flash vaporization technique. The invention is particularly applicable to the removal from acids of water and other materials more volatile than the acid.

The prior art of concentrating acids employs vessels holding large quantities of the acid such as brick lined still pots of the Simonsen-Mantius type or the lead evaporating pans. Where acid films have been employed in the reconcentration process the flow of the film has been over brick checkerwork and the heat applied by means of hot flue gases.

It is an object of this invention to provide a continuous process for the reconcentration of aqueous acids.

It is an object of this invention to provide a continuous process for the removal of water and other volatile materials from solutions thereof with acids.

It is another object of this invention to provide a process of flash evaporation for the removal of volatile material such as water and alcohol from solutions thereof with acids.

It is a further object of this invention to provide a continuous process for the simultaneous removal of water and alcohol from sulfuric acid solutions thereof.

These and other objects of the invention are achieved by passing the aqueous acid solution in long thin streams of definite length and cross sectional area downwardly through a heating zone under specific conditions of temperature, pressure and linear velocity. Specifically the objects are accomplished by passing the aqueous acid downwardly through the tube or tubes, of a tubular heat exchanger under specific conditions of temperature, pressure and linear velocity.

This invention is particularly applicable to the evaporation of water from aqueous acids which have been recovered from chemical reaction mixtures containing organic matter, for example, sulfuric acid recovered from the production of alcohol from olefins. In those instances where the aqueous sulfuric acid results from a chemical reaction some quantity of the organic matter always remains in the acid solution because of its solubility or as a by-product of reaction with the acid. When such acid is restored at atmospheric pressure by techniques disclosed by the art, the organic material in the acid decomposes to carbon and tarry products as the acid strength approaches 60–70%. Evaporation under vacuum is necessary to prevent the decomposition. Evaporation at atmospheric pressure is more desirable because construction and operation of equipment is less expensive and steam requirements are lower. Evaporation of water by passage of the dilute acid through the tubular exchanger can be done without appreciable decomposition of the organic material. Since higher average heat transfer rates can be maintained by the tubular exchanger, less steam is used than when vacuum is employed.

The practice of the invention will be described for illustrative purposes only for the removal of water from aqueous sulfuric acid solutions. Typical aqueous acid solutions are recovered from those processes involving the production of alcohols from olefins. For example, olefin hydrocarbons such as ethylene, propylene, butylene or amylene are absorbed in sulfuric acid of 70–98 weight percent strength. The acid extracts formed by reaction of sulfuric acid and olefin are diluted with water, hydrolyzed and steam stripped to remove the alcohol. The spent acid at about 45 weight percent strength is recovered for reconcentration to the strength desired for absorption. The acid can be concentrated at atmospheric pressure to about 70 weight percent strength. From 70% to higher strengths the concentration is carried out under vacuum. The concentration from 45% to 70% when accomplished according to the prior art methods takes place with sufficient decomposition of organic material originally present in the spent acid to form carbon and tar, which accumulates in the concentrating vessel, fouling the heat surface.

These disadvantages are minimized considerably by employing the restoration process illustrated in the drawing in which the single figures represents a flow diagram showing an elevational view of typical apparatus employed in the process.

Referring to the drawing, aqueous sulfuric acid, for example, acid of 45 weight percent strength, is pumped via line 1 into a vaporizer 2. In the drawing the vaporizer is illustrated as a tube-in-shell heat exchanger of the conventional type. Numeral 3 represents the exchanger tubes which may vary in length between 5 and 20 feet, preferably 10 feet, and in diameter between ½″ to 2″, preferably about ¾″. The acid solution is pumped through the exchanger tubes wherein it is rapidly heated during passage therethrough at a pressure of 0 to 5 p. s. i. g., preferably about 0.5 p. s. i. g. and a linear velocity of 0.05 to 2.0 ft./sec., preferably 0.10 to 0.62 ft./sec. The exchanger tubes are heated by means of steam at 50 to 175 lbs. gauge pressure or other fluid circulating in indirect heat exchange with the acid solution. The heating medium enters the exchanger vessel via line 4 and emerges via line 5. For the removal of water from sulfuric acid solutions temperatures in the range of 100° C. to 180° C., preferably from 140° C. to 165° C. are employed.

Under the above conditions some of the water contained in the aqueous acid solution is vaporized during passage through the tubes leaving the acid in a more concentrated condition. The vaporized water and acid are carried rapidly from the exchanger tube through line 6 into disengaging vessel 7. In vessel 7 the vaporized water is rapidly separated from the acid and removed by passage from the vessel through line 8, while the acid which has been reconcentrated to approximately 70 weight percent collects in vessel 7 as a body 9 and is withdrawn via line 10 for use as such or for further reconcentration. The acid of 70 weight percent concentration can be further concentrated, for example, to 95 weight percent acid, by repeated passage of the acid through the vaporizer via line 17 at atmospheric pressure. Alternatively, acids of concentrations above 70 weight percent up to 95 weight percent can be obtained from 45 weight percent acid by carrying out the vaporization in the heat exchanger under subatmospheric pressure, preferably pressures of 0.5 to 10 mm., preferably about 5 mm. Overhead vapors comprising water are removed via line 8 and may be employed as low pressure steam for any desired use.

The invention is also applicable to the simultaneous removal of water and alcohol from spent acid solutions. In the alcohol process the hydrolyzed extract is led via line 12 to stripping vessel 13 wherein it is heated by means of steam entering at the bottom thereof via line 14. The heating action of the steam strips the alcohol from the hydrolyzed acid solution, the alcohol is removed overhead from stripper 13 via line 15. Spent sulfuric acid of approximately 45 weight percent containing 0.5 to 5.0 weight percent alcohol is removed from the bottom of stripper 13 via line 16 and passed via line 1 to vaporizer 2. The operation of the vaporizer and the disengaging vessel is identical with that previously described except the alcohol is vaporized along with the water so that alcohol and water are removed by flashing from vessel 7 via line 8. The steam containing the alcohol is recycled via lines 11 and 14 to vessel 13 thereby serving as the heating medium and returning the alcohol to the stripper for further recovery. It has been found that decomposition of organic material present in the acid to tar and carbon is practically eliminated by the acid reconcentration process described. The heating surface of the vaporizer does not become fouled with tar or carbon because of the fast moving liquid film. Equipment service factors have been found to be greater for the flash vaporizer than for the conventional concentrators.

In the vaporizer 2 conditions throughout are to be closely controlled to attain best operation. Proper flow of the solution is necessary so that all parts of it receive substantially identical and immediate heat treatment. This is accomplished by proper association of the heating medium or heat transfer elements with the respective liquid paths. Every part of the solution stream during its passage through the vaporizer lies sufficiently close to the heating medium or heat transfer element to insure uniformity of temperature throughout the solution during its brief passage through the vaporizer. The tube-in-shell heat exchanger equipment is preferred for the process of this invention because the design and arrangement of the tubes within the shell is such that the tubes seem to divide the body of solution entering the header thereof into a plurality of longitudinal streams whose greatest length is parallel to the direction of acid flow, thus offering maximum resistance to lateral flow. The dimensions of the longitudinal streams should be 5 or more feet in length up to 20 feet and between ½" and 2", preferably ¾" in diameter. In this manner the distance of any solution particle from any heating medium or heat exchange surface will be kept from exceeding a definite maximum during passage of the solution through the heating medium or heat exchange surface.

The length and diameter of the heated stream of acid solution must be limited to maintain proper water removal and to assure proper acid reconcentration. When a tubular heat exchanger is employed in the process these factors can be controlled by the length and diameter of the tubes themselves. The tube length may vary preferably between 5 and 20 feet and more preferably about 10 feet. Too short a tube does not provide sufficient surface and heat to insure complete removal of water while passage of the acid through too long a tube causes prolonged contact of the acid with the hot surface giving rise to degradation of the acid in color, and carbonization of any organic material which may be present. The tubes may vary in diameter from about ½" to 2", preferably about ¾". In employing the tubular heat exchanger it is preferred to increase the surface when occasion demands it by increasing the number of tubes in the exchanger rather than increasing the length of any of the tubes. The length of the tube will be dictated by a number of factors, e. g., steam pressure, linear velocity, etc.

The shape of the tubes may vary widely. However, the cross-sectional area of the tube must be restricted by maintaining the tube relatively narrow in at least one transverse dimension. The shape of the cross-sectional area of the stream being heated (i. e., the shape of the tube in the case of the tubular heat exchanger) is immaterial as long as any particle of the stream is kept within the maximum distance tolerated from the heating surface or heating medium. For example, the cross-sectional area may be circular or non-circular. The non-circular may be square, rectangular, ellipsoidal, star-shaped, etc., but preferably ellipsoidal. However, according to this invention, at least one transverse dimension of the cross-sectional area should be within ½" to 2" for an unobstructed stream. Thus the greatest distance between an particle of the stream and a heat exchange surface is ¼" to 1". In this manner the proper amount of heat is applied to the aqueous acid stream, uniformly, at the proper time, and for the proper duration. Tubes of greater diameters than those mentioned may be employed provided they are supplied with filler bars.

The flow of material through the flash evaporator is essentially downward. Downward flow at an angle of 45° or more, nearly vertical, is preferred.

EXAMPLE I

A number of runs were made employing weak sulfuric acid recovered from the production of alcohol from olefins. The weak acid was passed at uniform velocity downwardly through heated tubes of a tube-in-shell type heat exchanger. During the passage the water became vaporized while rapidly descending the heated tubes. The effluent from the tubes entered the disengaging vessel where the water was rapidly flashed off leaving a concentrated sulfuric acid collecting in a pool in the disengaging vessel. The data in the following runs illustrate that acid of 43–46 weight percent concentration is concentrated in one pass to 58–65 weight percent without attendant deposition of carbon and tar in the acid.

*Table I*

| Run No. | 14 | 17 | 19 |
|---|---|---|---|
| Tube | 1" x 10' Durimet. | ½" x 10' Copper. | ½" x 10' Copper. |
| Feed Rate, l/min | 0.4 | 0.2 | 0.207. |
| Outlet Temp., ° C | 139.4 | 163.7 | 161.2. |
| Inlet Pressure, #g | 3.8 | 6.4 | 8.1. |
| Outlet Pressure, #g | 2.0 | 2.0 | 4.4. |
| Percent $H_2SO_4$ Feed | 46.61 | 44.34 | 44.45. |
| Percent $H_2SO_4$ Produced | 58.57 | 64.73 | 65.26. |
| Steam Pressure on Tube | 102.5 | 103.6 | 102.6. |
| Acid Feed Source | sec-butyl Alcohol. | sec-butyl Alcohol. | sec-butyl Alcohol. |

EXAMPLE II

A weak acid of 47.7 weight per cent strength was recovered from the stripper employed in the secondary butyl alcohol manufacturing process. This acid contained 1.76 weight per cent secondary butyl alcohol. After passage through the flash vaporizer system, the recovered acid contained only 0.07 weight per cent secondary butyl alcohol while the overhead stream from the disengaging vessel comprised 14.63 weight per cent secondary butyl alcohol and the balance water. During passage through the vaporizer the acid was concentrated from 47.7 weight per cent to 69.6 weight per cent.

Another run was made in which the acid feed contained a lower concentration of alcohol, namely, 0.14 weight per cent secondary butyl alcohol. After passage through the vaporizer the concentrated acid was essentially free of alcohol, containing only a trace (too low to analyze), while the overhead from the disengaging vessel contained 0.31 weight per cent secondary butyl alcohol.

Complete operating data on these two runs are recorded in the following Table II.

*Table II*

| Run No. | 31 | 32 |
|---|---|---|
| Tube | ½" x 10' Tantalum. | ½" x 10' Tantalum. |
| Feed Rate (l/min.) | 0.297 | 0.303. |
| Outlet Temperature (° F.) | 332 | 329. |
| Inlet Pressure (p. s. i. g.) | 13.2 | 7.0. |
| Outlet Pressure (p. s. i. g.) | 0 | 0. |
| Percent $H_2SO_4$ Feed | 47.36 | 47.7. |
| Percent $H_2SO_4$ Produced | 66.2 | 69.6. |
| Steam Pressure on Tube (p. s. i. g.) | 118 | 120. |
| Acid Feed Source | sec-butyl alcohol. | sec-butyl alcohol. |
| Percent Alcohol in: | | |
| Feed | 0.14 | 1.76. |
| Product Acid | Trace | 0.07. |
| Overhead | 0.31 | 14.63. |

Any non-volatile acid may be concentrated by the process described. Those acids which may be employed are exemplified by sulfuric acid, phosphoric acid, benzene sulfonic acid, toluene sulfonic acid, the alkyl sulfonic acids such as ethane sulfonic acids, etc. Hydrochloric acid, hydrobromic acid, nitric acid, acetic acid, and other relatively volatile acids are not suitable for restoration by the process described because of their tendencies to form constant boiling mixtures with water. Such mixtures would be lost in the overhead from the disengaging vessel.

What is claimed is:

1. A process for removing a volatile substance from non-volatile acids containing the same which comprises injecting a non-volatile acid contaminated with a volatile organic material at a linear velocity of 0.05 to 2.0 feet per second downwardly through an externally heated elongated tube of 5 to 20 feet in length and ½" to 2" in at least one transverse dimension, whereby the volatile substance is vaporized and travels concurrently with the acid through the tube, continuously passing the acid and volatilized vapor in uninterrupted flow through the elongated tube into a disengaging zone and rapidly removing the volatilized vapor from the non-volatile acid in the disengaging zone.

2. A process according to claim 1 in which the volatile substance is water and in which the acid is sulfuric acid.

3. A process according to claim 1 in which the acid is passed through a plurality of heated elongated tubes to a common disengaging zone.

4. A process for removing volatile substances comprising alcohol and water from sulfuric acid containing the same which comprises injecting the acid at a linear velocity of 0.05 to 2.0 feet per second downwardly through an externally heated elongated tube of 5 to 25 feet in length and ½ to 2 inches in one transverse dimension, whereby the volatile substance is vaporized and travels concurrently with the acid through the tube, continuously passing the acid and volatilized vapor in uninterrupted flow through the elongated tube into a disengaging zone and rapidly removing the volatilized vapor from the acid in the disengaging zone.

References Cited in the file of this patent

UNITED STATES PATENTS

| | | |
|---|---|---|
| 264,208 | Walker | Sept. 12, 1882 |
| 300,185 | Yaryan | June 10, 1884 |
| 374,268 | Pischon et al. | Dec. 6, 1887 |
| 1,006,823 | Block | Oct. 24, 1911 |
| 1,440,026 | Nillson | Dec. 26, 1922 |
| 1,778,959 | Peterson | Oct. 21, 1930 |
| 1,902,533 | Vykoupil | Mar. 21, 1933 |
| 1,906,399 | Montgomery | May 2, 1933 |
| 1,969,793 | Hechenbleikner | Aug. 14, 1934 |
| 2,029,831 | Petersen | Feb. 4, 1936 |
| 2,124,729 | Castner | July 26, 1938 |
| 2,348,328 | Chapman | May 9, 1944 |
| 2,414,759 | Mottern | Jan. 21, 1947 |
| 2,463,453 | Beardsley | Mar. 1, 1949 |
| 2,467,769 | Morrow et al. | Apr. 19, 1949 |
| 2,562,495 | Hulme | July 30, 1951 |